United States Patent [19]
Sheridan

[11] 3,773,439
[45] Nov. 20, 1973

[54] RECIPROCATING IN-LINE MAGNETIC ACTUATOR

[76] Inventor: Francis R. Sheridan, 170-23 Pacific Ave., Spanaway, Wash. 98387

[22] Filed: Sept. 1, 1972

[21] Appl. No.: 285,837

[52] U.S. Cl................ 417/415, 310/80, 310/103
[51] Int. Cl. ............................................ H02k 7/06
[58] Field of Search.............. 310/103, 20, 23, 310/24, 80; 417/415–417; 74/99, 50, 11 R

[56] References Cited
UNITED STATES PATENTS

| | | | |
|---|---|---|---|
| 3,606,595 | 9/1971 | Takamizawa | 417/417 |
| 3,328,615 | 6/1967 | Bakker et al. | 310/80 |
| 3,431,788 | 3/1969 | Du Pre | 74/44 |
| 2,790,095 | 4/1957 | Peck et al. | 310/103 |

*Primary Examiner*—D. F. Duggan
*Attorney*—Eugene D. Darley

[57] ABSTRACT

A reciprocating magnetic actuator comprises a pair of suitably guided magnets axially aligned with each other. A drive reciprocates one of the magnets between an advanced position and a retracted position. In its advanced position it exerts a magnetic influence on the second magnet causing the latter to alter its position. Upon retraction of the first magnet, a suitable drive connected to the second magnet restores it to its original position. The cycle then is repeated. In this manner reciprocating motion is imparted to the second magnet without physical contact with the first.

10 Claims, 3 Drawing Figures

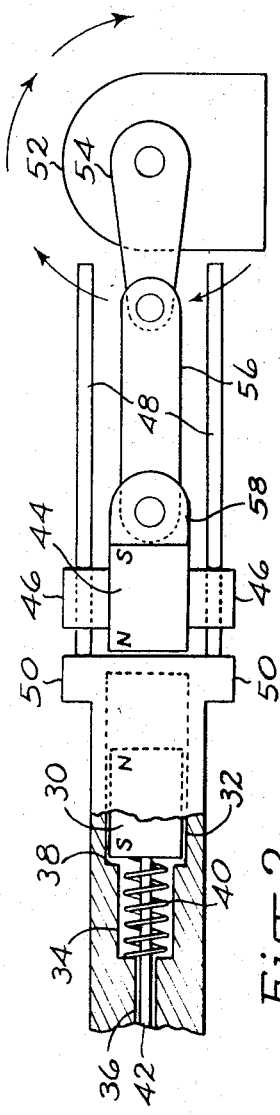
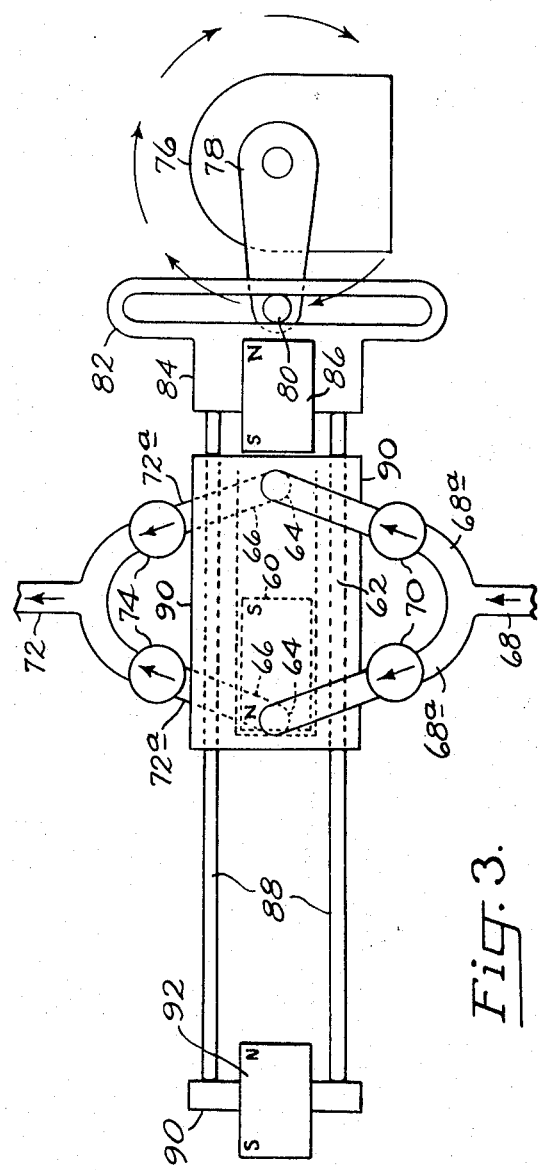
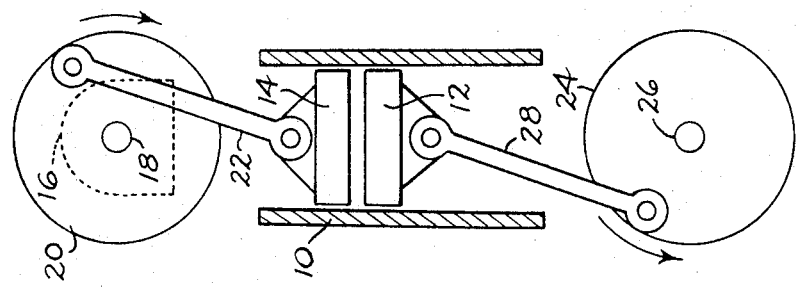

RECIPROCATING IN-LINE MAGNETIC ACTUATOR

This invention relates to reciprocating, magnet-driven actuators.

Although many types of actuators heretofore have been devised, the need exists for reciprocating actuators, or reciprocating power transmissions, which operate without communication or interconnection with any outside power source whatsoever, including sources of electrical power.

It accordingly is the general purpose of the present invention to provide such a reciprocating actuator, or power transmission, which operates by the interplay of magnetic forces, which is simple in construction, powerful and reliable in operation, and adaptable for driving and controlling a multiplicity of types of apparatus.

It is a particular object of the present invention to provide a reciprocating magnetic actuator which is well adapted to the driving of a pump by remote control, the pump impeller having no physical contact whatsoever with the driving force.

The foregoing and other objects of this invention are accomplished by the provision of a reciprocating magnetic actuator comprising a floating first magnet freely reciprocatable between two positions, a second magnet in substantial axial alignment with the first magnet, and a first drive means connected to the second magnet for reciprocating it in axial movement between advanced and retracted positions.

In its advanced position, the pole on the outer end of the second magnet lies within the effective field of force of the pole in the outer end of the first magnet and accordingly moves the latter to a remote position. Second drive means is associated with the first magnet for shifting it in the direction of the second magnet as the latter reciprocates to its retracted position. Power take-off means is connected to the first magnet enabling its application as a remote drive to the operation of a valve, an electric switch, or, particularly, the impeller of a pump. The cycle then is repeated.

Considering the foregoing in greater detail, and with particular reference to the drawings wherein:

FIG. 1 is a schematic plan view, partly in section, of the reciprocating in-line magnetic actuator of the invention in a first embodiment.

FIG. 2 is a schematic view in side elevation, partly in section, of the reciprocating in-line magnetic actuator of the invention in a second embodiment, and FIG. 3 is a schematic view in plan of the reciprocating in-line actuator of the invention as applied to the operation of a pump.

Considering first the embodiment of FIG. 1:

The reciprocating magnetic actuator of FIG. 1 includes an elongated guide 10 of non-magnetic material. Mounted for free floating reciprocating movement within the guide is a floating magnet 12.

Also mounted for reciprocating movement within the guide is a second magnet 14 which serves as a remote drive for the floating magnet.

The two magnets are arranged so that when both are advanced toward each other, their adjacent poles lie within each other's respective fields of force. However, when they are in their retracted positions remote from each other, their adjacent poles lie outside of their respective fields of force.

Magnet 14 is driven by an assembly including a rotary motor 16, preferably an electric motor. The drive shaft 18 of the motor is keyed to a crank assembly including wheel 20 and crank 22. One end of the latter pivotally is connected to the peripheral margin of wheel 20 and the other to magnet 14. The crank assembly accordingly drives the magnet in the desired reciprocating movement, the stroke of the crank determining the limits of the reciprocating movement.

A second drive is provided which reciprocates floating magnet 12 in timed sequence corresponding to the reciprocation of drive magnet 14.

To this end there is provided a fly wheel assembly including a weighted fly wheel 24 and a connecting link 28. One end of the latter is pivotally connected peripherally to a fly wheel 24 which is keyed to a power take-off shaft 26. The other end pivotally is connected to magnet 12.

Accordingly, in the operation of the reciprocating magnetic actuator of FIG. 1, advancement of magnet 14 to a position adjacent to magnet 12 brings the like poles of the two magnets in close proximity to each other. The resulting repelling force displaces floating magnet 12 in the direction away from magnet 10, thereby imparting a power stroke to connecting link 28. This rotates fly wheel 24 and applies power to power take-off shaft 26.

Upon retraction of magnet 14, the inertia of fly wheel 24 advances magnet 12 in timed movement until the latter magnet assumes a position wherein it lies within the field of force of magnet 10 on the next advancing stroke of the latter. In this manner power is developed in take-off shaft 26 without physical contact between the driving and driven elements of the assembly.

The principal of operation of the actuator of FIG. 2 is similar to that described above, except that the means for returning the floating magnet to its retracted position comprise a coil spring, rather than a weighted fly wheel.

In the embodiment of FIG. 2, the floating magnet 30 is housed in a chamber 32 which serves as a guide. The chamber has a reduced portion 34 which communicates with a sleeve 36.

Magnet 30 thus is free to reciprocate within limits imposed by the end wall of chamber 32 and a shoulder 38" which separates sections 32, 34 of the chamber.

A compression spring 40 is mounted within chamber section 34. It biases magnet 30 toward its retracted position. As magnet 30 reciprocates, it acts as a piston.

A shaft 42 which serves as a piston rod is connected at one of its ends to the magnet. The shaft penetrates compression spring 40 and works in sleeve 36 which serves as a guide. The outer end of the shaft, not illustrated, is connected to the device to be operated.

Floating magnet 30 is reciprocated between its advanced and retracted positions by means of a drive magnet 44. This magnet is arranged preferably with its leading pole of like polarity to that of the adjacent end of the floating magnet. Drive magnet 44 is mounted on guide means which include a pair of slides 46, one on each side of the magnet. These slide on rods or guides 48 mounted on lateral projections 50 of the walls defining chamber 32.

Crank means is provided for reciprocating magnet 44 between advanced and retracted positions. The crank means employed for this purpose comprises a rotary motor 52 to the drive shaft of which is fixed one end of a crank 54. The other end of the crank is pivotally connected to one end of a connecting link 56. The other end of the connecting link, in turn, is pivotally connected to tabs 58 extending outwardly from magnet 44.

Accordingly, in the operation of the form of the invention illustrated in FIG. 2, crank 54 reciprocates magnet 44 in straight line reciprocating movement between advanced and retracted positions. In the advanced position ofthe magnet it moves within the field of force of floating magnet 30, causing the latter to retract, and compressing spring 40.

Then as magnet 44 moves to its retracted position, the spring pushes floating magnet 30 to its retracted position ready for another stroke of driving magnet 44. This cycle is repeated over and over again, thereby imparting a reciprocating motion to drive shaft 42, which may be coupled to a device to be operated.

In the embodiment illustrated in FIG. 3, the floating magnet is employed as the impeller of a pump. Such a pump is useful in situations where the impeller must be completely insulated and separated from the driving mechanism.

As shown in FIG. 3, floating magnet 60 is contained in a chamber 62 defined by a case of non-magnetic material. The chamber is provided with inlet ports 64 and companion outlet ports 66 at each end. The ports communicate with a fluid circuit including a reservoir, not illustrated, but designed to contain a quantity of liquid to be pumped.

An infeed conduit 68 communicates with the reservoir. The infeed conduit branches into two lines 68a each of which communicates with one inlet port 64 in chamber 62. Each of the branch infeed lines 68a includes a check valve 70.

Fluid fed into chamber 62 via lines 68a is pumped by floating magnet 60 outwardly from the chamber through an outfeed conduit 72. The latter includes a pair of branch conduits 72a one of which communicates with one of outlet ports 66 in the chamber. Each of the branch conduits includes an appropriately arranged check valve 74.

The drive for reciprocating floating magnet 60 comprises a rotary motor 76. The shaft of the motor is connected to a crank 78. The outer end of the crank mounts a laterally extending pin 80 which works in a slotted guide bar 82.

The latter element of the assembly mounts a laterally extending socket 84 which supports a second or drive magnet 86. The outwardly extending pole of the latter magnet preferably is of like polarity to the opposed pole of floating magnet 60.

Guide means is provided for guiding the magnet support in linear motion as, driven by crank 78, it moves between advanced and retracted positions.

The guide means comprises parallel, outwardly extending rods 88. These are received in parallel slides 90 formed in the case defining chamber 62.

Rods 88 are substantially elongated. Their outer ends are spaced and supported in a cross piece 90. The latter cross piece supports a third magnet 92 which serves as a drive for returning floating magnet 60 to its retracted position after having been advanced by the action of drive magnet 86. It preferably is arranged with the pole most closely adjacent floating magnet 60 of like polarity.

In the operation of the pump of FIG. 3, crank 78 moves drive magnet 86 to its advanced position. By the force of magnetic repulsion this shifts floating magnet 60 to its advanced position, i.e. the position of FIG. 3. It also moves magnet 92 to a position remote from magnet 60.

Crank 78 thereupon moves drive magnet 86 to its retracted position. In so doing it shifts magnet 92 to a corresponding position. In its latter position, magnet 92 is in close proximity to floating magnet 60. The force of magnet repulsion thereupon shifts floating magnet 60 to its retracted position, ready for another advancing stroke of drive magnet 86.

This cycle is repeated over and over. Each time magnet 60 moves from one side to the other, it pumps fluid contained in chamber 82 out one or the other of outfeed conduits 72a and admits a corresponding amount of fluid to the chamber behind the magnet via one of the other of infeed conduit 68a. Floating magnet 60 thus acts as the impeller of a pump which is completely separate and apart from the driving mechanism.

It is to be noted that in all of the forms of the invention illustrated in FIGS. 1, 2 and 3, the magnets are arranged in axial alignment with each other, as are the guides which contain them. In addition, the drives are such as to impart linear motion to the magnets. This is an important feature of the invention, since it ensures that the magnets will move toward and away from each other in straight line axial motion thereby developing a magnetic drive of maximum strength.

Having thus described my invention in preferred embodiments, I claim:

1. A reciprocating magnetic actuator comprising:
   a. a first guide of non-magnetic material,
   b. a floating first magnet freely reciprocatable between two positions in the first guide,
   c. stop means of non-magnetic material arranged to arrest reciprocation of the first magnet at predetermined travel limits,
   d. a second guide of non-magnetic material in substantial axial alignment with the first guide,
   e. a second magnet in the second guide in substantial axial alignment with the first magnet,
   f. first drive means connected to the second magnet for reciprocating it in axial movement between an advanced position wherein the pole of its outer end lies within the effective field of force of the pole on the outer end of the first magnet and a retracted position wherein the pole of its outer end lies outside the effective field of force of the pole on the outer end of the first magnet,
   g. the first magnet being shifted by magnetic forces from one to the other of its positions upon movement of the second magnet to its advanced position,
   h. second drive means associated with the first magnet for shifting it from said other to said one of its positions as the first drive means shifts the second magnet to its retracted position,
   i. and power take-off means connected to the first magnet.

2. The reciprocating magnet actuator of claim 1 wherein the first and second magnets are arranged with like poles opposite each other and the first magnet is shifted by the force of magnetic repulsion upon advancement of the second magnet.

3. The reciprocating magnet actuator of claim 1 wherein the first drive means comprises motor driven crank means.

4. The reciprocating magnet actuator of claim 1 wherein the second drive means comprises fly wheel driven crank means.

5. The reciprocating magnet actuator of claim 1 wherein the second drive means comprises compression spring means positioned behind the first magnet in bearing compression contact therewith.

6. The reciprocating magnet actuator of claim 1 wherein the second drive means comprises a third magnet in axial alignment with the first and second magnets and drive means connected to the third magnet for reciprocating it between an advanced position wherein it lies within the field of force of the first magnet and by magnetic force shifts it from said other to said one of its positions, and a retracted position wherein it is removed from the field of force of the first magnet.

7. The reciprocating magnet actuator of claim 1 wherein the power take-off means comprises a crank pivotally attached to the first magnet, a fly wheel pivotally connected to and operated by the crank, and a power take-off shaft mounting the fly wheel.

8. The reciprocating magnet actuator of claim 1 wherein the first magnet serves as a piston and the power take-off means comprises a piston rod connected to the first magnet.

9. The reciprocating magnet actuator of claim 1 wherein the first and second magnets are arranged with like poles opposite each other, wherein the second drive means comprises a spring biasing the first magnet in the direction of the second magnet, and wherein the power take-off means comprises a piston rod connected to the first magnet.

10. The reciprocating magnet actuator of claim 1 wherein the first magnet acts as the impeller of a pump and including a pump circuit comprising:
1. a sealed chamber housing and guiding the first magnet,
2. inlet and exhaust ports at at least one end of the chamber,
3. a reservoir containing fluid to be pumped,
4. a fluid feed line with included check valve means interconnecting the reservoir and the inlet port of the chamber, and
5. a fluid discharge line with included check valve means connected to the outlet port of the chamber,
6. the reciprocation of the first magnet acting to pump the fluid from the reservoir to the fluid discharge line.

* * * * *